(12) United States Patent
Benzin

(10) Patent No.: US 12,525,750 B2
(45) Date of Patent: Jan. 13, 2026

(54) ROUND PLUG CONNECTOR COMPRISING A SHIELD CONNECTION

(71) Applicant: HARTING Electric Stiftung & Co. KG, Espelkamp (DE)

(72) Inventor: Marian Benzin, Hille (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 450 days.

(21) Appl. No.: 18/017,714

(22) PCT Filed: Jul. 23, 2021

(86) PCT No.: PCT/DE2021/100639
§ 371 (c)(1),
(2) Date: Jan. 24, 2023

(87) PCT Pub. No.: WO2022/022775
PCT Pub. Date: Feb. 3, 2022

(65) Prior Publication Data
US 2023/0275375 A1 Aug. 31, 2023

(30) Foreign Application Priority Data
Jul. 31, 2020 (DE) .................. 10 2020 120 306.3

(51) Int. Cl.
*H01R 13/6583* (2011.01)
*H01R 13/627* (2006.01)
*H01R 13/6592* (2011.01)

(52) U.S. Cl.
CPC ....... *H01R 13/6583* (2013.01); *H01R 13/627* (2013.01); *H01R 13/6592* (2013.01)

(58) Field of Classification Search
CPC ............ H01R 13/6583; H01R 13/6592; H01R 13/627
USPC .................................................... 439/607.19
See application file for complete search history.

(56) References Cited

U.S. PATENT DOCUMENTS

| | | | | |
|---|---|---|---|---|
| 3,669,472 A * | 6/1972 | Nadsady | ............. | F16L 27/1274 411/953 |
| 4,493,520 A * | 1/1985 | Davies | ............... | H01R 13/6276 439/350 |
| 4,544,224 A | 10/1985 | Goodman et al. | | |
| 4,726,782 A * | 2/1988 | Hager | ................. | H01R 13/622 439/321 |
| 4,808,117 A * | 2/1989 | Gale | .................... | H01R 13/639 439/321 |
| 4,808,123 A * | 2/1989 | Dee | ........................ | H01R 13/59 439/321 |

(Continued)

FOREIGN PATENT DOCUMENTS

DE 102017124141 A1 4/2019

*Primary Examiner* — Harshad C Patel
(74) *Attorney, Agent, or Firm* — Smartpat PLC

(57) ABSTRACT

A round plug connector for releasably connecting lines has at least one housing element for receiving at least one insulating body and at least one locking element for releasably connecting to a mating plug connector. The housing element receives at least one circumferential spring element, and the spring element is made of an electrically conductive material in order to attach to an electromagnetic shielding, wherein the spring element is held in a circumferential recess of the housing element and has at least two bulges facing radially outwards.

13 Claims, 3 Drawing Sheets

(56) References Cited

U.S. PATENT DOCUMENTS

| | | | | |
|---|---|---|---|---|
| 4,820,184 | A * | 4/1989 | Brandes | H01R 13/639 439/321 |
| 5,209,523 | A * | 5/1993 | Godeau | F28F 9/0246 285/379 |
| 5,399,096 | A * | 3/1995 | Quillet | H01R 13/622 439/321 |
| 5,653,605 | A * | 8/1997 | Woehl | H01R 13/622 439/321 |
| 6,123,563 | A * | 9/2000 | Johnson | H01R 13/622 439/321 |
| 6,152,753 | A * | 11/2000 | Johnson | H01R 13/622 439/321 |
| 7,625,226 | B1 * | 12/2009 | Gastineau | H01R 13/639 439/321 |
| 7,845,963 | B2 * | 12/2010 | Gastineau | H01R 13/639 439/321 |
| 7,914,311 | B1 * | 3/2011 | Gallusser | H01R 13/639 439/321 |
| 9,166,348 | B2 * | 10/2015 | Burris | H01R 13/5202 |
| 9,325,106 | B2 * | 4/2016 | Arcykiewicz | H01R 13/622 |
| 9,528,646 | B2 * | 12/2016 | Hyzin | F16L 19/005 |
| 10,290,958 | B2 * | 5/2019 | Burris | H01R 13/502 |
| 2010/0120282 | A1 | 5/2010 | Williams et al. | |
| 2017/0018875 | A1 * | 1/2017 | Bauer | H01R 13/6275 |
| 2023/0070142 | A1 * | 3/2023 | Benzin | H01R 13/629 |

\* cited by examiner

ROUND PLUG CONNECTOR COMPRISING A SHIELD CONNECTION

TECHNICAL FIELD

The disclosure relates to a round plug connector comprising a shield connection, in particular for round plug connectors with a push-pull locking system.

BACKGROUND

Round plug connectors are needed to connect cables, especially those containing electrically conductive cores, to devices and/or other cables. Particularly in the field of data transmission, cables and plug connectors are required that have a high level of electromagnetic compatibility (EMC). For this purpose, cables and some of the cores they contain are sheathed with conductive wire, wire mesh and/or foil. In order to transmit this shielding with a plug connector, various means are used for shield connection.

In the prior art, resilient elements made of electrically conductive materials are preferably used to transmit an electromagnetic shield from an electrically conductive cable via a plug connector to a mating plug connector.

The use of spring washers is usually particularly suitable for round plug connectors. The use of corrugated spring washers for shield connection is very particularly popular for round plug connectors.

The disadvantage of using spring washers, including corrugated spring washers, is the lack of application safety for round plug connectors with a so-called push-pull locking system. Due to the operating principle of the locking system, simple spring washers cannot sufficiently ensure that the shield connection is reliably provided also during operation and the vibrations that may occur.

In the priority application for the present application, the following prior art was searched by the German Patent and Trade Mark Office: DE 10 2017 124 141 A1 and U.S. Pat. No. 4,544,224 A.

SUMMARY

The object of the disclosure is to equip known round plug connectors with a push-pull locking system by an element for shield connection, which is simple and cost-effective to produce and can be used reliably.

The object is achieved by the subject matter of the independent claim.

Advantageous embodiments of the invention are described in the dependent claims and the following description.

An embodiment provides a round plug connector for detachably connecting lines, comprising at least one housing element for receiving at least one insulating body and at least one locking element for detachably connecting to a mating plug connector, wherein the housing element receives at least one circumferential spring element, and wherein the spring element is made of an electrically conductive material for connecting an electromagnetic shield, and wherein the spring element is held in a circumferential recess of the housing element and comprises at least two radially outwardly pointing bulges. The term "lines" preferably refers to electrically conductive cores of a cable. In addition, an optical signal line or a combination of electrically conductive core and/or optical signal line and/or a fluid line can be used. A "housing element" refers in particular to at least one electrically conductive component of the round plug connector, which is located in the connection region to a mating plug connector. Very particularly preferably, the housing element is formed as a metal sleeve. A round plug connector can have various housing elements for connection to a conductor and/or a cable having a conductor, for example a union nut for connecting the round plug connector to a strain relief means and/or a cable outlet. Plastics cylinders which have at least one through-opening to receive at least one contact element are usually used as insulating bodies. The contact element establishes the connection of the electrical and/or optical and/or fluid transmission with a corresponding contact element. The corresponding contact element is usually located in a mating plug connector corresponding to the round plug connector or in a corresponding add-on housing. The locking element is understood to be a component that interacts with the mating plug connector in such a way as to prevent an undesired release of the plug connection. The spring element for shield connection according to the invention is particularly advantageous when using a so-called push-pull locking mechanism. Such locking mechanisms are embodied with detent shapes so that the various detent shapes interact with each other when the plug connectors are plugged together. By means of release shapes, for example catch hooks, in at least one of the plug connectors, this connection can be easily released by applying a tensile force to the housing element provided for this purpose. In doing so, the release shapes engage at least one locking element, for example, and release it from the corresponding locking element. The spring element according to the invention is made of an electrically conductive material. In particular, the spring element is made of metal materials, in particular copper-containing alloys are provided, and the use of copper-beryllium alloys is very particularly preferred. Alternative alloys, for example spring bronze, and/or other materials are furthermore conceivable, for example spring steel. Within the scope of the disclosure of the invention, a recess is to be understood first of all as at least one radial groove in which at least one ring of the spring element can be inserted. A bulge means that the outer diameter of the spring element is deformed outwardly by at least half the thickness of the spring element. Here, the bulge ideally assumed a new diameter, which is greater than or equal to the inner diameter of a mating plug connector.

A preferred embodiment provides that the spring element comprises at least one cutout, wherein the cutout allows a reduction of the diameter and thus firstly at least simplifies a plugging process. This means that the cutout allows a compliance of the spring element at least during the process of plugging the round plug connector to a corresponding mating plug connector, so that the mating plug connector can be brought into engagement with the round plug connector. The bulges then ensure the contacting of the mating plug connector, while the spring element in the cutout ensures the reliable contacting of the round plug connector. In addition, the cutout allows the round plug connector to be assembled quickly and in an uncomplicated way. The spring element can be widened in a flexible deformation region in order to be guided over a housing element and inserted in a circumferential recess.

In a clever embodiment the bulges of the spring element each comprise at least one radially inwardly pointing indentation. This indentation ensures that in each case at least two regions of the bulge point outwardly and protrude beyond an outer diameter of the spring element, whereas the indentation is deformed inwardly at least half the thickness of the spring element. Ideally, the indentation is shaped in such a way that the diameter of the spring element at the lowest point of the indentation assumes the outer diameter again. In addition, it is possible to shape at least one indentation in such a way that the diameter of the spring element is reduced at the lowest point of the indentation. As a result of this indentation, the contact to the round plug connector is improved particularly advantageously. In other words, the bulges establish the contact with the round plug connector. Furthermore, one embodiment provides that the indentation is arranged substantially centrally of each bulge. In particular, the shield connection of the round plug connector with the mating plug connector is thus ensured.

A further embodiment provides arranging the bulges on the spring element at a distance of from 100° to 140° to one another. In other words, the at least two bulges are arranged, for example, at the positions 0° and 100° on the circumference of the spring element. Ideally, three bulges are arranged at the positions 0°, 120° and 240°. In this way, the shield transfer can be transferred both at the round plug connector and at the corresponding mating plug connector.

In an alternative embodiment the bulges and concavity extend alternately along at least half the length of the spring element. In a preferred embodiment the bulges and indentation alternate from a first end of the spring element to a second end of the spring element. Here, the first and second end are formed by the cutout.

A further embodiment provides that the bulges and at least the indentation ensure that, during a process of plugging the round plug connector to a mating plug connector, the spring element is clamped with frictional engagement between the round plug connector and the mating plug connector. This means that the spring element with bulges and indentation presses against the round plug connector and a corresponding mating plug connector in order to allow a reliable shield transfer. Due to the spring force of the spring element, this shield transfer can also be maintained in the event of movements during the operation of a work machine.

A particular advantageous embodiment provides here that the recess is arranged behind the locking element as viewed in the plug-in direction. This means that, during a plugging process, the spring element is firstly contacted by a corresponding mating plug connector on a round plug connector according to the invention of the mating plug connector, before the locking elements of the mating plug connector are brought into engagement with the locking elements of the round plug connector.

BRIEF DESCRIPTION OF THE DRAWINGS

An exemplary embodiment of the invention is shown in the drawings and is explained in more detail below. In the drawings.

DETAILED DESCRIPTION

The figures contain partially simplified, schematic representations. In part, identical reference signs are used for like, but possibly not identical elements. Different views of like elements may be scaled differently. Directional indications such as "top", "bottom", "left", "right", "front" and "back" refer to the various representations and may vary in respect of the elements shown.

Figure 1:
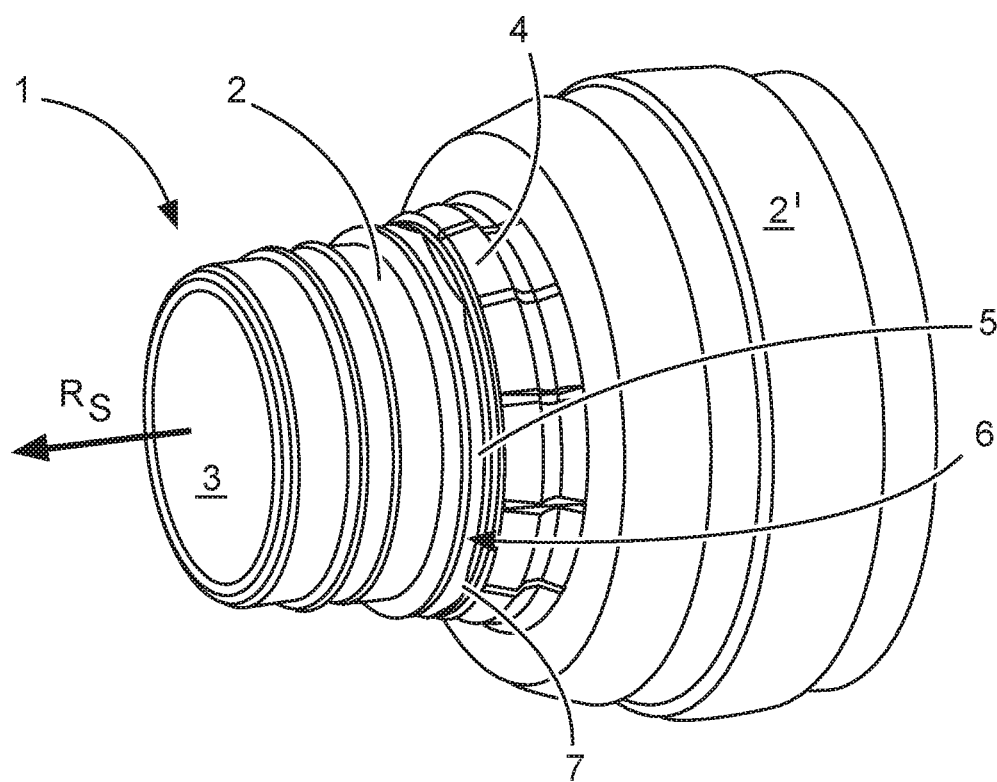
FIG. 1 shows a perspective view of a round plug connector.

FIG. 1 shows the plug-in region of a round plug connector 1 according to the invention, wherein the round plug connector 1 has at least two housing elements 2 and 2'. Here, the housing element 2 receives an insulating body 3. Recesses in the housing element 2 receive the locking elements 4 along the circumference of the housing element 2. The locking elements 4 are formed as detent hooks and are provided for a push-pull locking mechanism. The spring element 5 for shield connection, also received by the housing element 2, can be seen. The spring element 5 is located in a recess 6 which is formed as a circumferential groove. The spring element 5 is secured in the axial direction by this recess 6.

Figure 2:
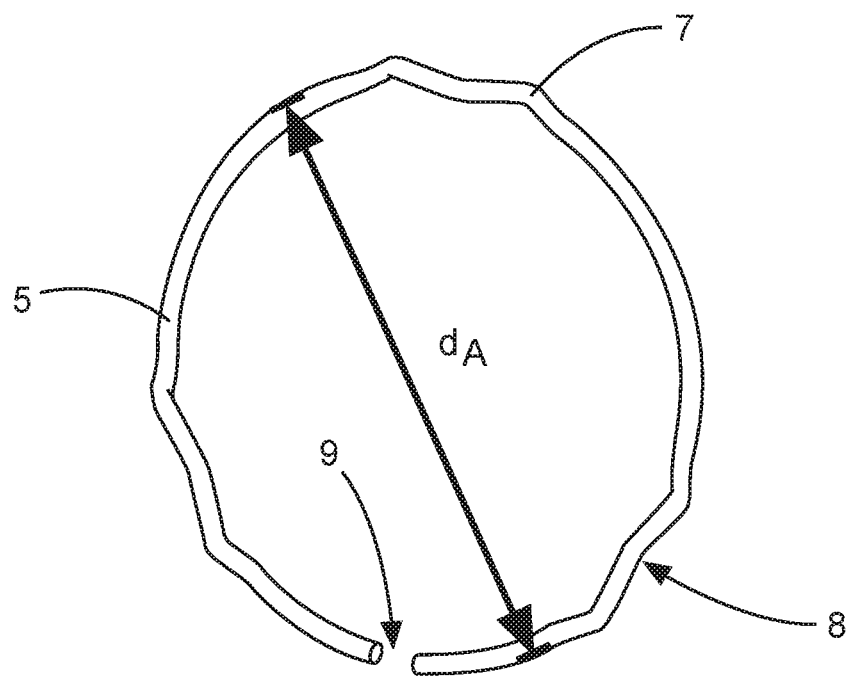
FIG. 2 shows a perspective view of a spring element for shield connection.

FIG. 2 shows the spring element 5 according to the invention, wherein the design is clearly illustrated. The spring element 5 has three bulges 7, which each have an indentation 8 in their middle. The bulges 7 extend beyond the outer diameter $d_A$ of the spring element 5. The indentations 8 are formed in the middle of the bulges 7 and, at their low point, reduce the diameter to at least the outer diameter $d_A$ or there beyond. For manufacturing purposes and assembly purposes, the spring element 5 has a cutout 9. In addition, the cutout 9 can ensure a temporary yielding movement during the plugging process, whereby the plugging process between round plug connector 1 and mating plug connector is simplified. It can also be seen that the bulges 7 are arranged substantially at positions which would be displayed by a virtual, equilateral triangle within the spring element. In the shown embodiment the indentations 8 can be used as corner points of the virtual triangle.

Figure 3:
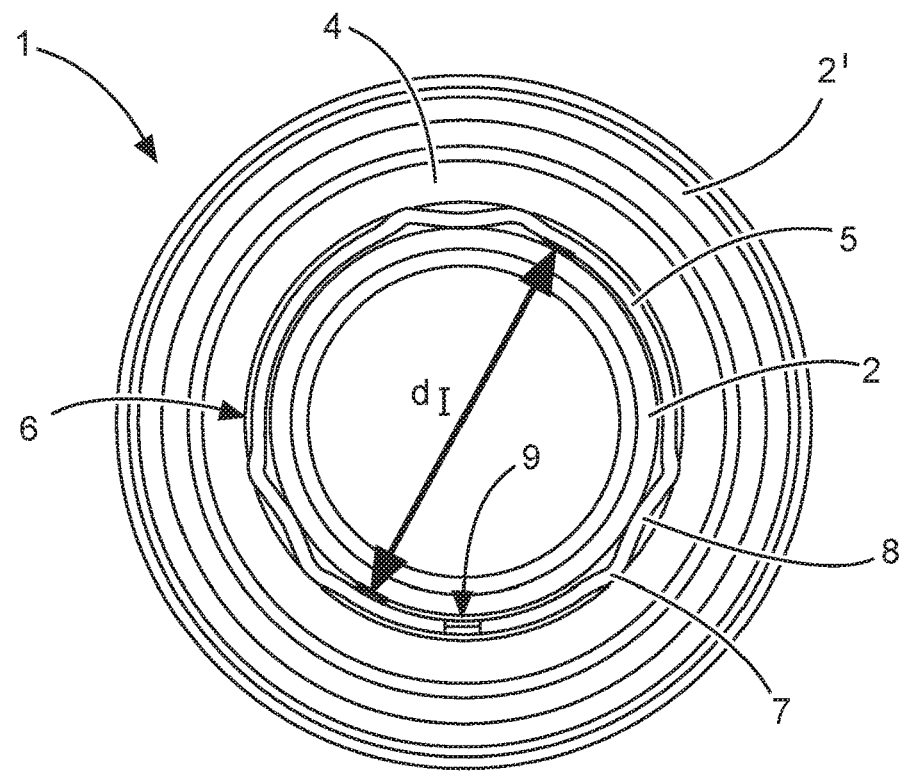
FIG. 3 shows a partial section focusing on the shield connection with a spring element.

FIG. 3 shows a round plug connector 1 in a front view, as seen against the plug-in direction $R_S$. Here, the operating principle of the improved spring element 5 for shield transfer is clear. The spring element 5 inserted into a recess 6 is fundamentally in contact with the housing element 2, wherein the bulges 7 protrude beyond the depth of the recess 6 embodied as a circumferential groove. A mating plug connector fixed with the locking element 4 on the round plug connector 1 presses the bulges 7 in the direction of the center point of the round plug connector 1. The bulges 7 thus contact the mating plug connector, and the rest of the spring element 5, in particular the indentations 8, is pressed against the housing element 2 by the resulting force acting on the bulges 7, whereby a reliable and permanent contacting is provided and a likewise reliable shield transfer is achieved.

Figure 4:
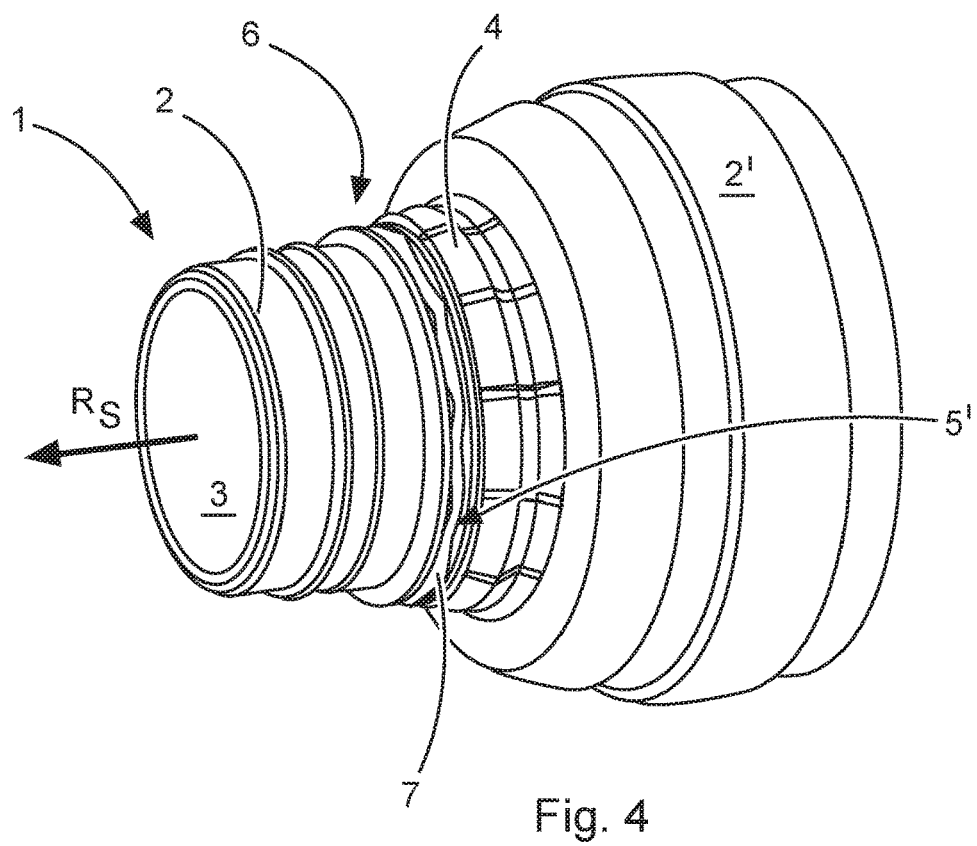
FIG. 4 shows a perspective view of a round plug connector with an alternative spring element.
Figure 5:
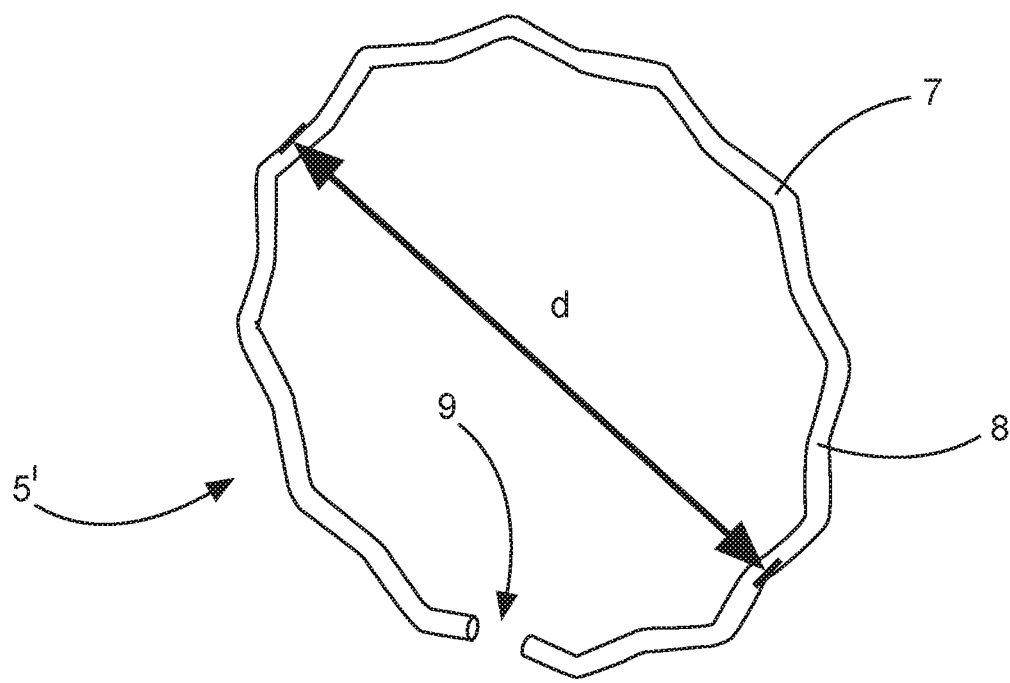
FIG. 5 shows a perspective view of an alternative embodiment of a spring element.
Figure 6:
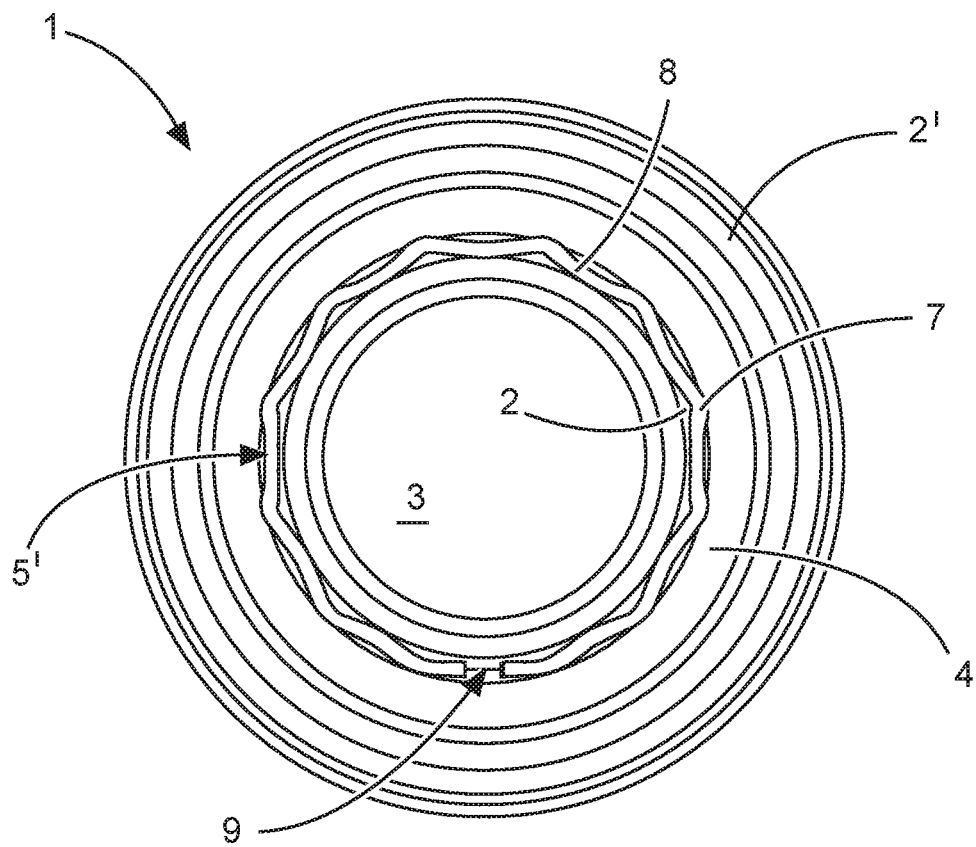
FIG. 6 shows a perspective view of an alternative spring element for shield connection.

A comparable or identical round plug connector 1 is shown in FIGS. 4, 5 and 6 and receives an alternative embodiment of the spring element 5' according to the invention in the recess 6 embodied as a circumferential groove. The spring element 5' performs substantially the same function as the spring element 5. Here, however, the bulges 7 and the indentations 8 alternate along the entire circumference. Both embodiments of the spring element 5 and 5' provide reliable contacting with a mating plug connector by way of the bulges 7 which exceed the averaged outer diameter $d_A$. The occurring forces against the bulges 7 in the plugged state of the round plug connector 1 with a mating plug connector force the indentations 8 to a diameter less than or equal to the averaged inner diameter $d_I$, whereby the contacting of the round plug connector 1 is ensured. Due to this clamping effect, the electrical shield connection is always ensured, even during operation of a work machine with a high occurrence of vibrations.

Even though various aspects or features of the invention are shown in each case in combination in the figures, it is apparent to a person skilled in the art—unless otherwise indicated—that the combinations shown and discussed are not the only possible ones. In particular, corresponding units or feature complexes from different exemplary embodiments may be interchanged with each other.

LIST OF REFERENCE SIGNS 1 round plug connector
2 housing element
3 insulating body
4 locking element
5 spring element
6 recess
7 bulge
8 indentation
9 cutout
$R_S$ plug-in direction
$d_A$ outer diameter
$d_1$ inner diameter
d averaged diameter

The invention claimed is:

1. A round plug connector for detachably connecting lines, comprising:
   a housing element;
   an insulating body received in the housing element;
   a locking element for detachably connecting the round plug connector to a mating plug connector; and
   a circumferential spring element received on the housing element,
   wherein the spring element is made of an electrically conductive material for connecting an electromagnetic shield, and
   wherein the spring element is held in a circumferential recess of the housing element and comprises at least two radially outwardly pointing bulges.

2. The round plug connector as claimed in claim 1, wherein the spring element comprises a cutout, wherein the cutout allows a reduction of a diameter of the spring element and thereby simplifies a plugging process.

3. The round plug connector as claimed in claim 1, wherein the bulges each comprise a radially inwardly pointing indentation.

4. The round plug connector as claimed in claim 3, wherein the indentation is arranged substantially centrally of each bulge.

5. The round plug connector as claimed in claim 1, wherein the bulges on the spring element are arranged at a distance of from 100° to 140° to one another.

6. The round plug connector as claimed in claim 1, wherein the bulges and indentation alternate along at least half a length of the spring element.

7. The round plug connector as claimed in claim 3, wherein the bulges and the indentation ensure that, during a process of plugging the round plug connector to the mating plug connector, the spring element is clamped with frictional engagement between the round plug connector and the mating plug connector.

8. The round plug connector as claimed in claim 1, wherein the recess is arranged behind the locking element as viewed in a plug-in direction.

9. The round plug connector as claimed in claim 1, wherein the locking element is designed for a locking mechanism of a "push-pull" locking type with the mating plug connector.

10. The round plug connector as claimed in claim 1, wherein the locking element is formed as detent hooks that engage the mating plug connector as part of a push-pull locking mechanism.

11. The round plug connector as claimed in claim 1, wherein the at least two radially outwardly pointing bulges are configured for contacting the mating plug connector.

12. The round plug connector as claimed in claim 1, wherein the circumferential recess is a circumferential groove on an outer side of the housing element.

13. The round plug connector as claimed in claim 1, wherein the at least two radially outwardly pointing bulges protrude outwardly from the circumferential recess.

* * * * *